(12) United States Patent
Abbaszadeh et al.

(10) Patent No.: US 6,370,201 B1
(45) Date of Patent: Apr. 9, 2002

(54) SIMPLIFIED BRANCH METRIC CALCULATION IN PRAGMATIC TRELLIS DECODERS

(75) Inventors: Ayyoob D. Abbaszadeh; Robert John Currie, both of Salt Lake City, UT (US)

(73) Assignee: L-3 Communications Corp., Salt Lake City, UT (US)

( * ) Notice: Subject to any disclaimer, the term of this patent is extended or adjusted under 35 U.S.C. 154(b) by 0 days.

(21) Appl. No.: 09/179,697

(22) Filed: Oct. 27, 1998

Related U.S. Application Data (60) Provisional application No. 60/064,152, filed on Nov. 4, 1997.

(51) Int. Cl.[7] ............................................. H04L 5/12
(52) U.S. Cl. ........................ 375/262; 375/265; 375/341; 714/792; 714/794; 714/795; 714/796
(58) Field of Search ................................. 375/261, 262, 375/265, 324, 326, 329, 340, 341; 714/792, 794, 795, 796

(56) References Cited

U.S. PATENT DOCUMENTS 5,394,439 A * 2/1995 Hemmati .................... 375/242
5,729,558 A * 3/1998 Mobin ........................ 371/43
5,838,729 A * 11/1998 Hu et al. .................... 375/265

* cited by examiner

Primary Examiner—Stephen Chin
Assistant Examiner—Dac V. Ha
(74) Attorney, Agent, or Firm—Perman & Green, LLP (57) ABSTRACT

A method of branch metric calculation of trellis coded data, suitable for a decoder of phase angle on a carrier modulated with phase shift keying (PSK) modulation, begins with an expressing angles of phase shift by a vectorial representation of sectors within quadrants of a circle. The sectors are subdivided into sub-sectors of differing sizes, and the sub-sectors are divided further into equal increments of angle referred to as PIEs. The PIEs and the quadrants are identified and, in each quadrant, there is an assigning of a set of branch metrics to serve as identifiers of respective ones of the sub-sectors in each sector of the quadrant. The set of branch metrics in one sector of the quadrant differs from the set of branch metrics in another of the sectors of the quadrant by a permutation of the branch metrics. The phase data is outputted in the form of branch metrics and quadrant for use by a decoder such as a Viterbi decoder.

11 Claims, 11 Drawing Sheets

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 32 | 0 | 0 | 0 | 0 | 0 | 0 | 0 | 0 | 0 | 0 | 0 | 0 | 0 | 0 | 0 | 0 | 0 | 0 | 0 |
| 1 | 63 | 32 | 18 | 13 | 9 | 8 | 6 | 5 | 5 | 4 | 4 | 3 | 3 | 3 | 2 | 2 | 2 | 2 | 2 | 2 |
| 2 | 63 | 45 | 32 | 23 | 18 | 15 | 13 | 11 | 9 | 8 | 8 | 7 | 6 | 6 | 5 | 5 | 5 | 4 | 4 | 4 |
| 3 | 63 | 50 | 40 | 32 | 26 | 22 | 18 | 16 | 14 | 13 | 11 | 10 | 9 | 9 | 8 | 8 | 7 | 7 | 6 | 6 |
| 4 | 63 | 54 | 45 | 37 | 32 | 27 | 23 | 21 | 18 | 17 | 15 | 14 | 13 | 12 | 11 | 10 | 9 | 9 | 8 | 8 |
| 5 | 63 | 55 | 48 | 41 | 36 | 32 | 28 | 25 | 22 | 20 | 18 | 17 | 16 | 14 | 13 | 13 | 12 | 11 | 11 | 10 |
| 6 | 63 | 57 | 50 | 45 | 40 | 35 | 32 | 28 | 26 | 23 | 22 | 20 | 18 | 17 | 16 | 15 | 14 | 13 | 13 | 12 |
| 7 | 63 | 58 | 52 | 47 | 42 | 38 | 35 | 32 | 29 | 26 | 24 | 23 | 21 | 20 | 18 | 17 | 16 | 15 | 15 | 14 |
| 8 | 63 | 58 | 54 | 49 | 45 | 41 | 37 | 34 | 32 | 29 | 27 | 25 | 23 | 22 | 21 | 19 | 18 | 17 | 17 | 16 |
| 9 | 63 | 59 | 55 | 50 | 46 | 43 | 40 | 37 | 34 | 32 | 29 | 27 | 26 | 24 | 23 | 22 | 20 | 19 | 18 | 18 |
| 10 | 63 | 59 | 55 | 52 | 48 | 45 | 41 | 39 | 36 | 34 | 32 | 30 | 28 | 26 | 25 | 23 | 22 | 21 | 20 | 19 |
| 11 | 63 | 60 | 56 | 53 | 49 | 46 | 43 | 40 | 38 | 36 | 33 | 32 | 30 | 28 | 27 | 25 | 24 | 23 | 22 | 21 |
| 12 | 63 | 60 | 57 | 54 | 50 | 47 | 45 | 42 | 40 | 37 | 35 | 33 | 32 | 30 | 28 | 27 | 26 | 25 | 23 | 22 |
| 13 | 63 | 60 | 57 | 54 | 51 | 49 | 46 | 43 | 41 | 39 | 37 | 35 | 33 | 32 | 30 | 29 | 27 | 26 | 25 | 24 |
| 14 | 63 | 61 | 58 | 55 | 52 | 50 | 47 | 45 | 42 | 40 | 38 | 36 | 35 | 33 | 32 | 30 | 29 | 28 | 26 | 25 |
| 15 | 63 | 61 | 58 | 55 | 53 | 50 | 48 | 46 | 44 | 41 | 40 | 38 | 36 | 34 | 33 | 32 | 30 | 29 | 28 | 27 |
| 16 | 63 | 61 | 58 | 56 | 54 | 51 | 49 | 47 | 45 | 43 | 41 | 39 | 37 | 36 | 34 | 33 | 32 | 30 | 29 | 28 |
| 17 | 63 | 61 | 59 | 56 | 54 | 52 | 50 | 48 | 46 | 44 | 42 | 40 | 38 | 37 | 35 | 34 | 33 | 32 | 30 | 29 |
| 18 | 63 | 61 | 59 | 57 | 55 | 52 | 50 | 48 | 46 | 45 | 43 | 41 | 40 | 38 | 37 | 35 | 34 | 33 | 32 | 30 |
| 19 | 63 | 61 | 59 | 57 | 55 | 53 | 51 | 49 | 47 | 45 | 44 | 42 | 41 | 39 | 38 | 36 | 35 | 34 | 33 | 32 |
| 20 | 63 | 61 | 59 | 57 | 55 | 54 | 52 | 50 | 48 | 46 | 45 | 43 | 41 | 40 | 39 | 37 | 36 | 35 | 34 | 33 |
| 21 | 63 | 62 | 60 | 58 | 56 | 54 | 52 | 50 | 49 | 47 | 45 | 44 | 42 | 41 | 40 | 38 | 37 | 36 | 35 | 34 |
| 22 | 63 | 62 | 60 | 58 | 56 | 54 | 53 | 51 | 49 | 48 | 46 | 45 | 43 | 42 | 40 | 39 | 38 | 37 | 36 | 34 |
| 23 | 63 | 62 | 60 | 58 | 56 | 55 | 53 | 51 | 50 | 48 | 47 | 45 | 44 | 43 | 41 | 40 | 39 | 38 | 36 | 35 |
| 24 | 63 | 62 | 60 | 58 | 57 | 55 | 54 | 52 | 50 | 49 | 47 | 46 | 45 | 43 | 42 | 41 | 40 | 38 | 37 | 36 |
| 25 | 63 | 62 | 60 | 59 | 57 | 55 | 54 | 52 | 51 | 49 | 48 | 47 | 45 | 44 | 43 | 41 | 40 | 39 | 38 | 37 |
| 26 | 63 | 62 | 60 | 59 | 57 | 56 | 54 | 53 | 51 | 50 | 49 | 47 | 46 | 45 | 43 | 42 | 41 | 40 | 39 | 38 |
| 27 | 63 | 62 | 60 | 59 | 58 | 56 | 55 | 53 | 52 | 50 | 49 | 48 | 46 | 45 | 44 | 43 | 42 | 41 | 40 | 39 |
| 28 | 63 | 62 | 61 | 59 | 58 | 56 | 55 | 54 | 52 | 51 | 50 | 48 | 47 | 46 | 45 | 43 | 42 | 41 | 40 | 39 |
| 29 | 63 | 62 | 61 | 59 | 58 | 57 | 55 | 54 | 53 | 51 | 50 | 49 | 48 | 46 | 45 | 44 | 43 | 42 | 41 | 40 |
| 30 | 63 | 62 | 61 | 59 | 58 | 57 | 55 | 54 | 53 | 52 | 50 | 49 | 48 | 47 | 46 | 45 | 44 | 42 | 41 | 40 |
| 31 | 63 | 62 | 61 | 60 | 58 | 57 | 56 | 54 | 53 | 52 | 51 | 50 | 48 | 47 | 46 | 45 | 44 | 43 | 42 | 41 |

FIG.8A

|    | 16 | 17 | 18 | 19 | 20 | 21 | 22 | 23 | 24 | 25 | 26 | 27 | 28 | 29 | 30 | 31 | 32 |
|----|----|----|----|----|----|----|----|----|----|----|----|----|----|----|----|----|----|
| 0  | 0  | 0  | 0  | 0  | 0  | 0  | 0  | 0  | 0  | 0  | 0  | 0  | 0  | 0  | 0  | 0  | 0  |
| 1  | 2  | 2  | 2  | 2  | 2  | 1  | 1  | 1  | 1  | 1  | 1  | 1  | 1  | 1  | 1  | 1  | 1  |
| 2  | 5  | 4  | 4  | 4  | 4  | 3  | 3  | 3  | 3  | 3  | 3  | 3  | 2  | 2  | 2  | 2  | 2  |
| 3  | 7  | 7  | 6  | 6  | 6  | 5  | 5  | 5  | 5  | 4  | 4  | 4  | 4  | 4  | 4  | 3  | 3  |
| 4  | 9  | 9  | 8  | 8  | 8  | 7  | 7  | 7  | 6  | 6  | 6  | 5  | 5  | 5  | 5  | 5  | 5  |
| 5  | 12 | 11 | 11 | 10 | 9  | 9  | 9  | 8  | 8  | 8  | 7  | 7  | 7  | 6  | 6  | 6  | 6  |
| 6  | 14 | 13 | 13 | 12 | 11 | 11 | 10 | 10 | 9  | 9  | 9  | 8  | 8  | 8  | 8  | 7  | 7  |
| 7  | 16 | 15 | 15 | 14 | 13 | 13 | 12 | 12 | 11 | 11 | 10 | 10 | 9  | 9  | 9  | 9  | 8  |
| 8  | 18 | 17 | 17 | 16 | 15 | 14 | 14 | 13 | 13 | 12 | 12 | 11 | 11 | 10 | 10 | 10 | 9  |
| 9  | 20 | 19 | 18 | 18 | 17 | 16 | 15 | 15 | 14 | 14 | 13 | 13 | 12 | 12 | 11 | 11 | 11 |
| 10 | 22 | 21 | 20 | 19 | 18 | 18 | 17 | 16 | 16 | 15 | 14 | 14 | 13 | 13 | 13 | 12 | 12 |
| 11 | 24 | 23 | 22 | 21 | 20 | 19 | 18 | 18 | 17 | 16 | 16 | 15 | 15 | 14 | 14 | 13 | 13 |
| 12 | 26 | 25 | 23 | 22 | 22 | 21 | 20 | 19 | 18 | 18 | 17 | 17 | 16 | 15 | 15 | 15 | 14 |
| 13 | 27 | 26 | 25 | 24 | 23 | 22 | 21 | 20 | 20 | 19 | 18 | 18 | 17 | 17 | 16 | 16 | 15 |
| 14 | 29 | 28 | 26 | 25 | 24 | 23 | 23 | 22 | 21 | 20 | 20 | 19 | 18 | 18 | 17 | 17 | 16 |
| 15 | 30 | 29 | 28 | 27 | 26 | 25 | 24 | 23 | 22 | 22 | 21 | 20 | 20 | 19 | 18 | 18 | 17 |
| 16 | 32 | 30 | 29 | 28 | 27 | 26 | 25 | 24 | 23 | 23 | 22 | 21 | 21 | 20 | 19 | 19 | 18 |
| 17 | 33 | 32 | 30 | 29 | 28 | 27 | 26 | 25 | 25 | 24 | 23 | 22 | 22 | 21 | 21 | 20 | 19 |
| 18 | 34 | 33 | 32 | 30 | 29 | 28 | 27 | 27 | 26 | 25 | 24 | 23 | 23 | 22 | 22 | 21 | 20 |
| 19 | 35 | 34 | 33 | 32 | 30 | 29 | 29 | 28 | 27 | 26 | 25 | 24 | 24 | 23 | 23 | 22 | 21 |
| 20 | 36 | 35 | 34 | 33 | 32 | 31 | 30 | 29 | 28 | 27 | 26 | 25 | 25 | 24 | 23 | 23 | 22 |
| 21 | 37 | 36 | 35 | 34 | 32 | 32 | 31 | 30 | 29 | 28 | 27 | 26 | 26 | 25 | 24 | 24 | 23 |
| 22 | 38 | 37 | 36 | 34 | 33 | 32 | 32 | 31 | 30 | 29 | 28 | 27 | 27 | 26 | 25 | 25 | 24 |
| 23 | 39 | 38 | 36 | 35 | 34 | 33 | 32 | 32 | 31 | 30 | 29 | 28 | 28 | 27 | 26 | 26 | 25 |
| 24 | 40 | 38 | 37 | 36 | 35 | 34 | 33 | 32 | 32 | 31 | 30 | 29 | 28 | 28 | 27 | 26 | 26 |
| 25 | 40 | 39 | 38 | 37 | 36 | 35 | 34 | 33 | 32 | 32 | 31 | 30 | 29 | 28 | 28 | 27 | 27 |
| 26 | 41 | 40 | 39 | 38 | 37 | 36 | 35 | 34 | 33 | 32 | 32 | 31 | 30 | 29 | 29 | 28 | 27 |
| 27 | 42 | 41 | 40 | 39 | 38 | 37 | 36 | 35 | 34 | 33 | 32 | 32 | 31 | 30 | 29 | 29 | 28 |
| 28 | 42 | 41 | 40 | 39 | 38 | 37 | 36 | 35 | 35 | 34 | 33 | 32 | 32 | 31 | 30 | 29 | 29 |
| 29 | 43 | 42 | 41 | 40 | 39 | 38 | 37 | 36 | 35 | 35 | 34 | 33 | 32 | 32 | 31 | 30 | 29 |
| 30 | 44 | 42 | 41 | 40 | 40 | 39 | 38 | 37 | 36 | 35 | 34 | 34 | 33 | 32 | 32 | 31 | 30 |
| 31 | 44 | 43 | 42 | 41 | 40 | 39 | 38 | 37 | 37 | 36 | 35 | 34 | 34 | 33 | 32 | 32 | 31 |

SIMPLIFIED BRANCH METRIC CALCULATION IN PRAGMATIC TRELLIS DECODERS

CROSS-REFERENCE TO A RELATED APPLICATION

Priority is herewith claimed under 35 U.S.C. §119(e) from Provisional Patent Application No. 60/064,152, filed Nov. 4, 1997 entitled "Simplified Branch Metric Calculation in Pragmatic Trellis Decoders", by Abbaszadeh et al. The disclosure of this Provisional Patent Application is incorporated by reference herein in its entirety.

BACKGROUND OF THE INVENTION

This invention relates to the decoding of phase shift keying (PSK) modulated signals suitable for a communication system and, more particularly, to a system for mapping inphase (I) and quadrature (Q) components in a vectorial representation of phase angle into four branch metrics and one sector number, suitable for use as a preprocessor unit before the core of a Viterbi decoder as in 8-PSK and 16-PSK pragmatic TCM decoders.

PSK modulated signals are often used in systems for communicating data. In such a signal, a carrier is modulated with stepwise increments of phase, such as 90° steps in a quadrature PSK modulation, 45° steps in an 8-PSK modulation, and steps of 22.5° in a 16-PSK modulation. Typically, such a communication system would include, at its transmission end, a source of carrier signal, and a PSK modulator responsive to an input binary data signal for modulating the carrier signal. At its receiving end, the communication system would include some form of a phase demodulator, or decoder, suitable for extracting from the carrier instantaneous values of its phase shift and the data represented by the phase shift modulation. A suitable decoder is a Viterbi decoder which is operative to demodulate the phase modulation, the accuracy of the demodulation being dependent on the amount of electrical noise which may be received along with the modulated signal.

The near optimum operation of a Viterbi decoder in the detection of PSK signals can be accomplished by use of a preprocessor which identifies each of the possible phase states in the received PSK signal. Presently available preprocessors suffer from the disadvantage of an excessive amount of circuitry, particularly memory.

SUMMARY OF THE INVENTION

The foregoing disadvantage is overcome and other benefits are provided by a phase calculation system which, in accordance with the invention, enables a reduction in the amount of the circuitry in the pre-processor, while providing a digital representation of phase states suitable for operation of a Viterbi decoder.

In the case of a PSK modulation which provides numerous increments of phase shift, such as a 16-PSK modulation having 16 separate phase states, the modulation encompasses 360° of phase shift. In the 16-PSK modulation, all of the phase states are spaced apart by equal phase increments of 22.5°, and may be represented by a set of vectors extending radially outward from a common origin. At the receiving end of the communication system, it is common practice to detect the values of phase shift by implementation of both inphase and quadrature channels. The signals outputted by the two channels constitute, respectively, I and Q components of the vector representing a present value of the carrier phase and magnitude.

It is possible to provide a memory storing a tabulation of all possible values of I and Q with the corresponding phase angle of the vector. Such a tabulation would involve more circuitry and consume more power than would be necessary to accomplish the task of determining the value of carrier phase.

PSK modulation is defined as a constellation of points on a circle separated by equal angles. In accordance with the invention, the sectors are defined as the regions between two vectors emanating from the origin of a circle and passing through the adjacent constellation points. The sectors are divided into equal number of smaller regions which, for convenience, may be referred to as sub-sectors. The sub-sectors divided into two smaller regions each of which, for sake of convenience, may be referred to as PIE (by analogy with sectors of a circular cake or pie). Further, in accordance with the invention, there has been found a set of four binary-formulated numbers, referred to as branch metrics, which represent the reliability that the corresponding constellation point was transmitted. The branch metrics are suitable for introduction into Viterbi decoder for enhanced operation of the Viterbi decoder. The mapping of constellation points to branch metrics is not unique over the complete constellation. In fact, the set of branch metric values in one sector, appear in some permuted version in all other sectors.

There are an even number of sectors in a quadrant, two sectors being present in 8-PSK and four sectors being present in 16-PSK. In each sector there are provided nine sub-sectors of which each of the first and ninth sub-sectors consist of only half as many PIEs as each of the remaining sub-sectors (the second through the eighth). By way of example, in the 16-PSK there are two PIEs for each of the second through the eight sub-sectors while the first and the ninth sub-sectors at the end of the sector have only one PIE each. For the 8-PSK, there are twice as many PIEs for each sub-sector as in the 16-PSK.

In the forgoing arrangement of the sub-sectors in each of the sectors, there is established a one-to-one correspondence between each sub-sector and a particular four-value branch metrics. By permutation of the four values of the branch metric terms, there are provided identifications for the sub-sectors if each of any other sectors, and other quadrant.

The foregoing identification of the sub-sectors within a quadrant provides for sufficient resolution of the sectors in the measurement of phase angle to insure an accurate measurement of the phase angle in PSK modulation. The same set of branch metrics appearing in any one quadrant appears in each of the other quadrants. Therefore, identification of any one of the 16 values of phase shift (for 16-PSK modulation) or any one of the 8 values of phase shift (for 8-PSK modulation) is accomplished by use of two identifiers. The first identifier is the quadrant established by the signs, positive or negative, of the I and the Q components. The second identifier is the corresponding sector number of the first quadrant. These two identifiers are employed readily to determine the branch metrics which are used by a decoder to determine the value of a phase angle, even in the presence of noise.

BRIEF DESCRIPTION OF THE DRAWING

The aforementioned aspects and other features of the invention are explained in the following description, taken in connection with the accompanying drawing figures wherein:

FIG. 8 comprises FIGS. 8A and 8B and shows a tabulation of unit sectors, or PIEs, as a function of address provided by inphase (I) and quadrature (Q) components of detected phase angle;

Identically labeled elements appearing in different ones of the figures refer to the same element but may not be referenced in the description for all figures.

DETAILED DESCRIPTION OF THE INVENTION

Figure 9:
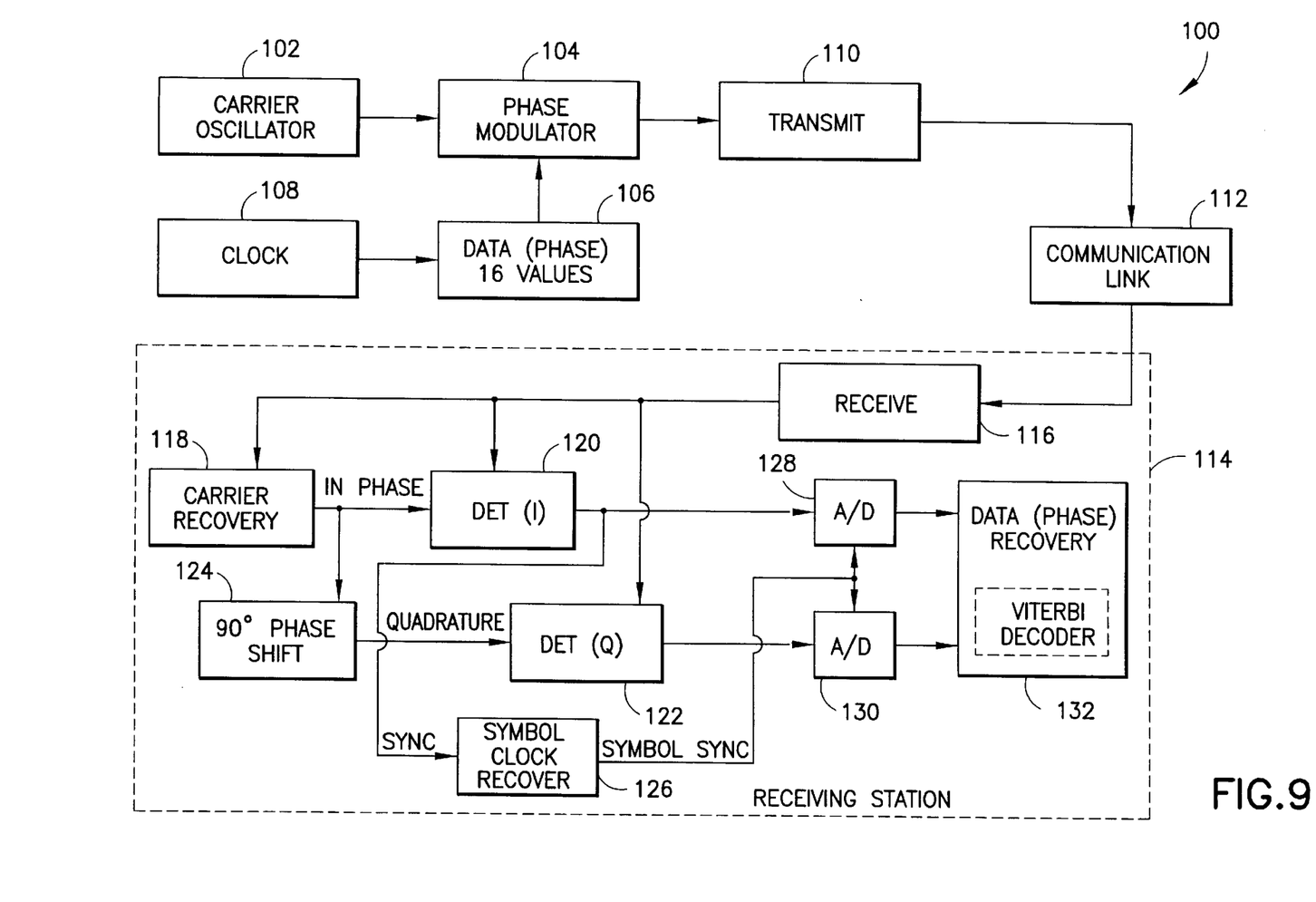
FIG. 9 shows diagrammatically a communication system suitable for practice of the invention.

In the reception of PSK modulated signal transmitted via a communication link, such as 16-PSK or 8-PSK modulation by way of example, a received carrier with phase modulation thereon is demodulated to provide I and Q components of the instantaneous value of phase shift. FIG. 9, to be described subsequently, shows a communication system employing phase shift keying modulation wherein received signals are demodulated to provide I and Q signals, respectively at detectors 120 and 122. The I and Q signals designate the value of a phase angle just received. The phase angles represent data transmitted via the communication link. The invention provides for the mapping of the soft I and Q channel data into four branch metrics and one sector number suitable for use by a decoder of 8-PSK and 16-PSK pragmatic codes, such as a Viterbi decoder. In the ensuing description, there is provided the mathematical basis for the mapping procedure as well as circuitry for accomplishing the mapping. The description begins with the mapping procedure for the case of 16-PSK modulation, and is then generalized to the case of 8-PSK modulation.

Figure 1:
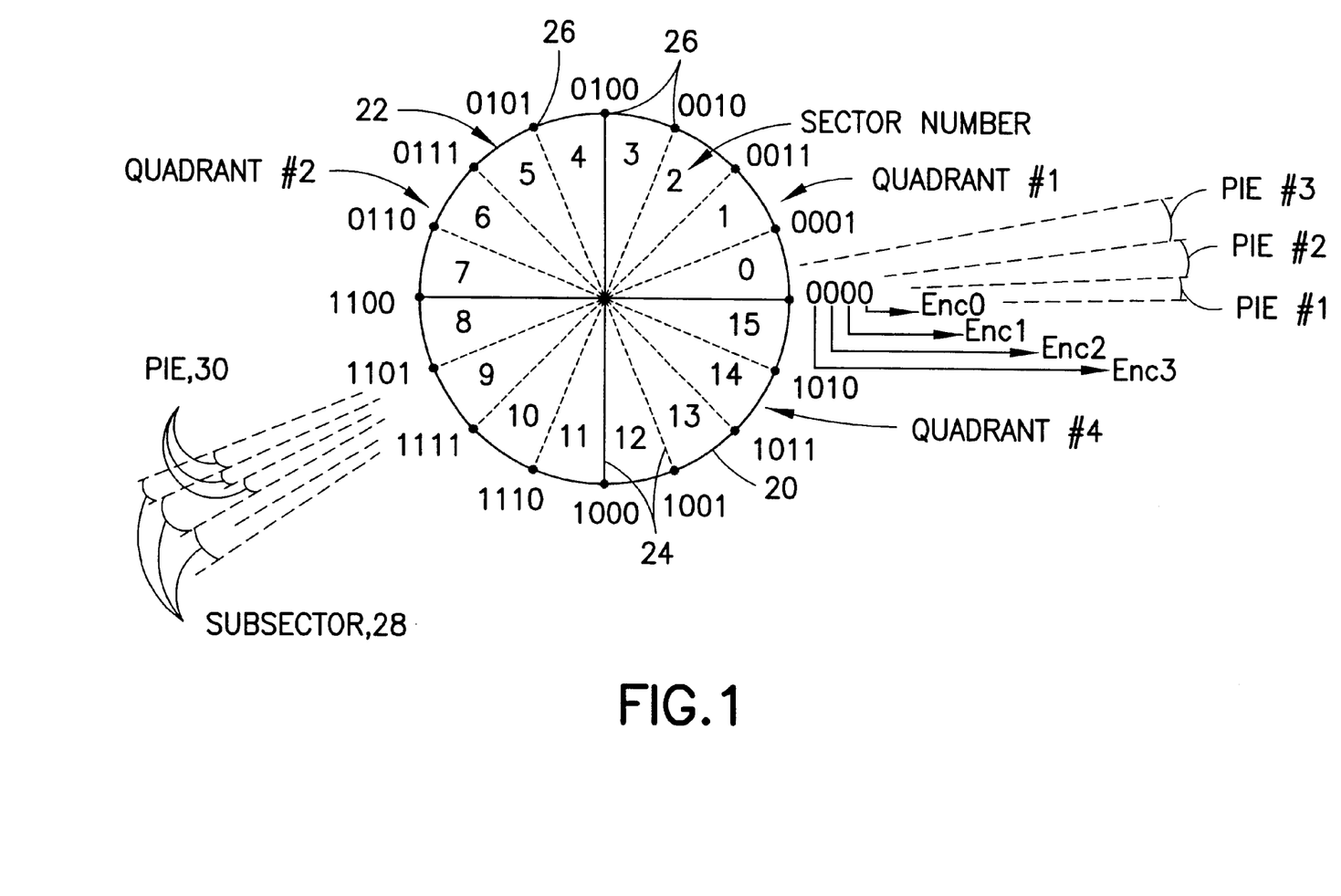
FIG. 1 is a diagram identifying phase angles of a 16-PSK modulation by sectors formed between vectors extending radially outward from a common origin.

FIG. 1 is a two-dimensional representation of phase angles shown as sectors 20 of a circle 22 wherein the sectors 20 are delineated by vectors 24 extending radially from the center of the circle 22. The sectors 20 are numbered consecutively counter-clockwise from the first quadrant through all four quadrants. The sectors 20 are identified further by constellation points 26 at the intersections of the vectors 24 with the circle 22. Each constellation point 26 is numbered with a four digit number of which the two left digits serve to identify the quadrant, and the two right digits serve to identify the sector 20. The sectors 20 are subdivided into sub-sectors 28 which differ in size, and are measured in terms of a unit measurement of angle 30 referred to as a PIE.

The four digit number identifying the constellation points is employed also to identify corresponding columns of branch metrics presented in Tables 1, 2 and 4. Therein, the letter B is substituted for the two left digits of the four digit number because the tables apply to each of the quadrants.

Figure 2:
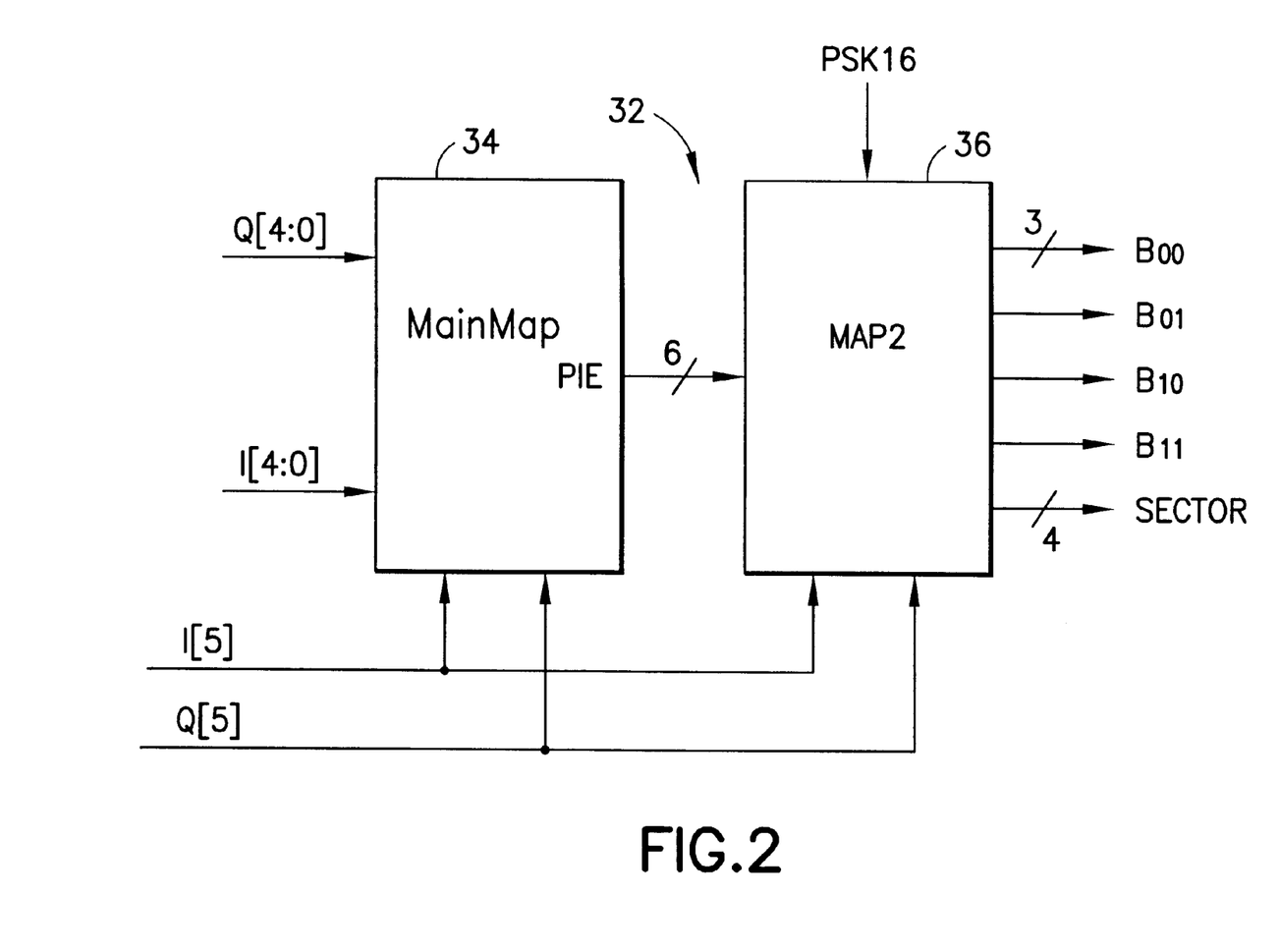
FIG. 2 is a block diagram of a mapper of inphase and quadrature components of a detected phase angle to a set of branch metrics identifying the phase angle.
Figure 3:
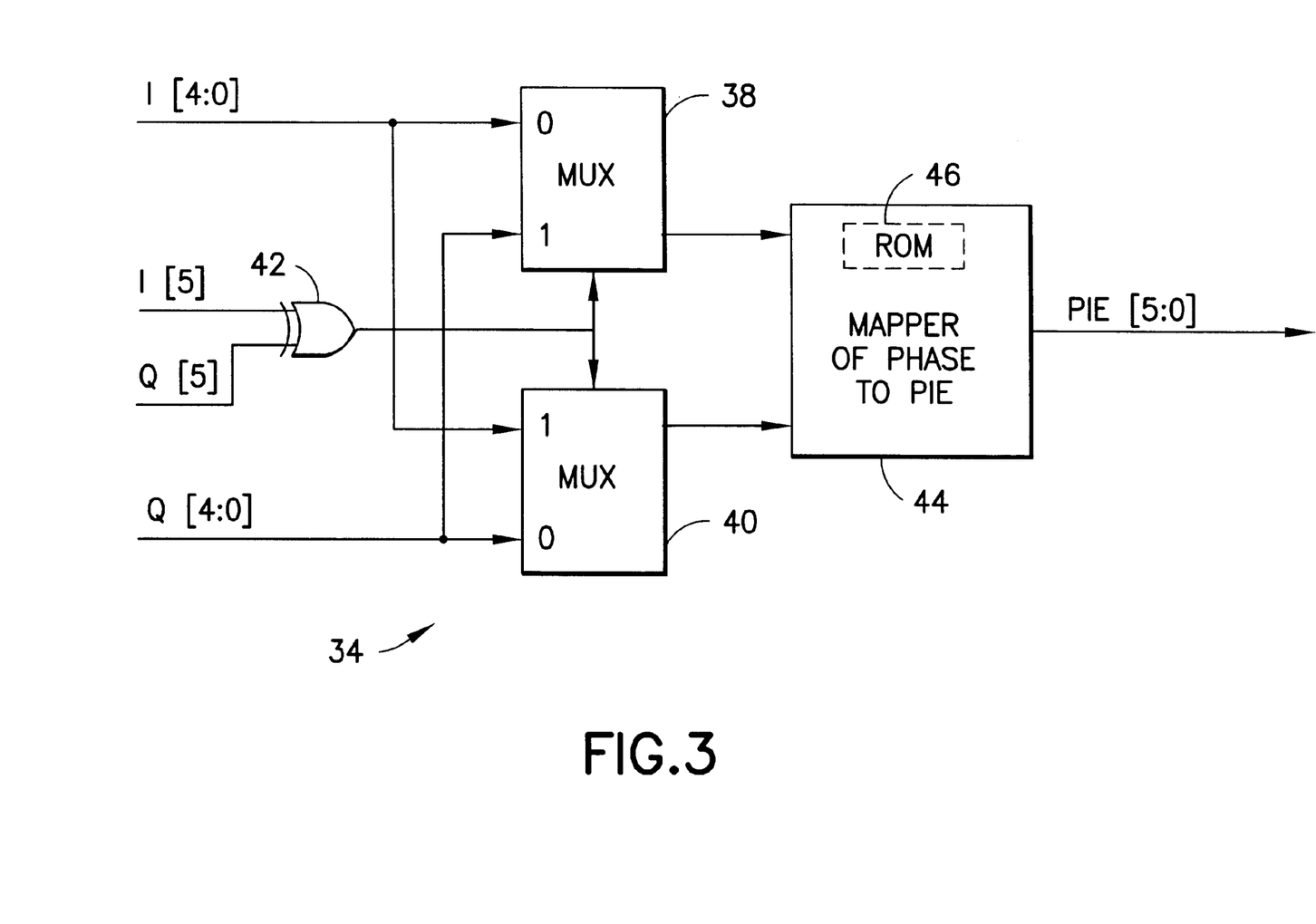
FIG. 3 show diagrammatically components of a first block of the mapper of FIG. 2.

The mapping procedure will be explained with respect to mappings presented in FIGS. 2, 3 and 4. In FIG. 2, a mapping system 32 comprises first and second mappers 34 and 36 identified respectively as MainMap and MAP2. Details in the construction of the first map 34 are presented in FIG. 3 which shows two multiplexers 38 and 40 driven by an exclusive-OR gate 42, and a mapper 44 of phase angle to PIE. The mapper 44 includes a read-only memory (ROM) 46 for storage of data used in the mapping of I and Q data of respective phase angles to the corresponding PIE. Only one-half quadrant of phase values need be stored due to symmetry of tangent and cotangent functions. Details in the construction of the second map 36 are presented in FIG. 4 which shows a multiplexer 48 feeding PIE data to a PIE-to-row mapper 50. The resulting row data is feed from the mapper 50 to a branch-metric mapper 52. Also included in the second mapper 36 is a sector mapper 54 which employs PIE data to determine the sector, a selector 56 which provides for the requisite permutation of branch metrics based on the sector, and an exclusive-OR gate 58 which drives the selector 56 via a multiplexer 60.

In the description, reference is made to data, such as I, Q, and PIE in terms of one or more digits of the binary number. For example, Q[5] means only one of the binary digits of Q, namely, the digit of 2 raised to the fifth power. Q[5,0] means all of the digits of Q from 2 raised to the fifth power to 2 raised to the zero power. PIE[5,4] means only two of the digits of PIE, namely, the digit of 2 raised to the fifth power and the digit of 2 raised to the fourth power.

Figure 4:
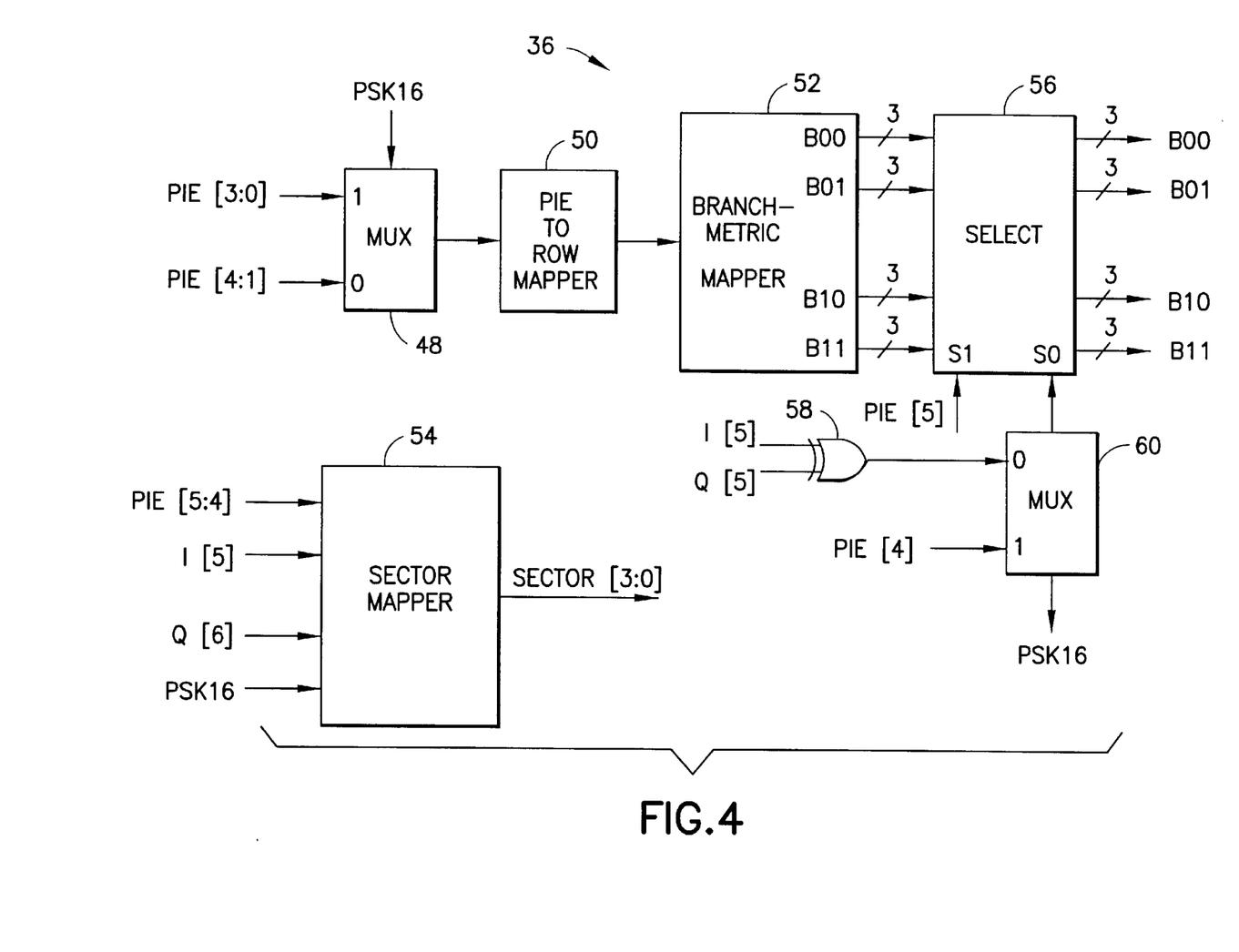
FIG. 4 show diagrammatically components of a second block of the mapper of FIG. 2.
Figure 5:
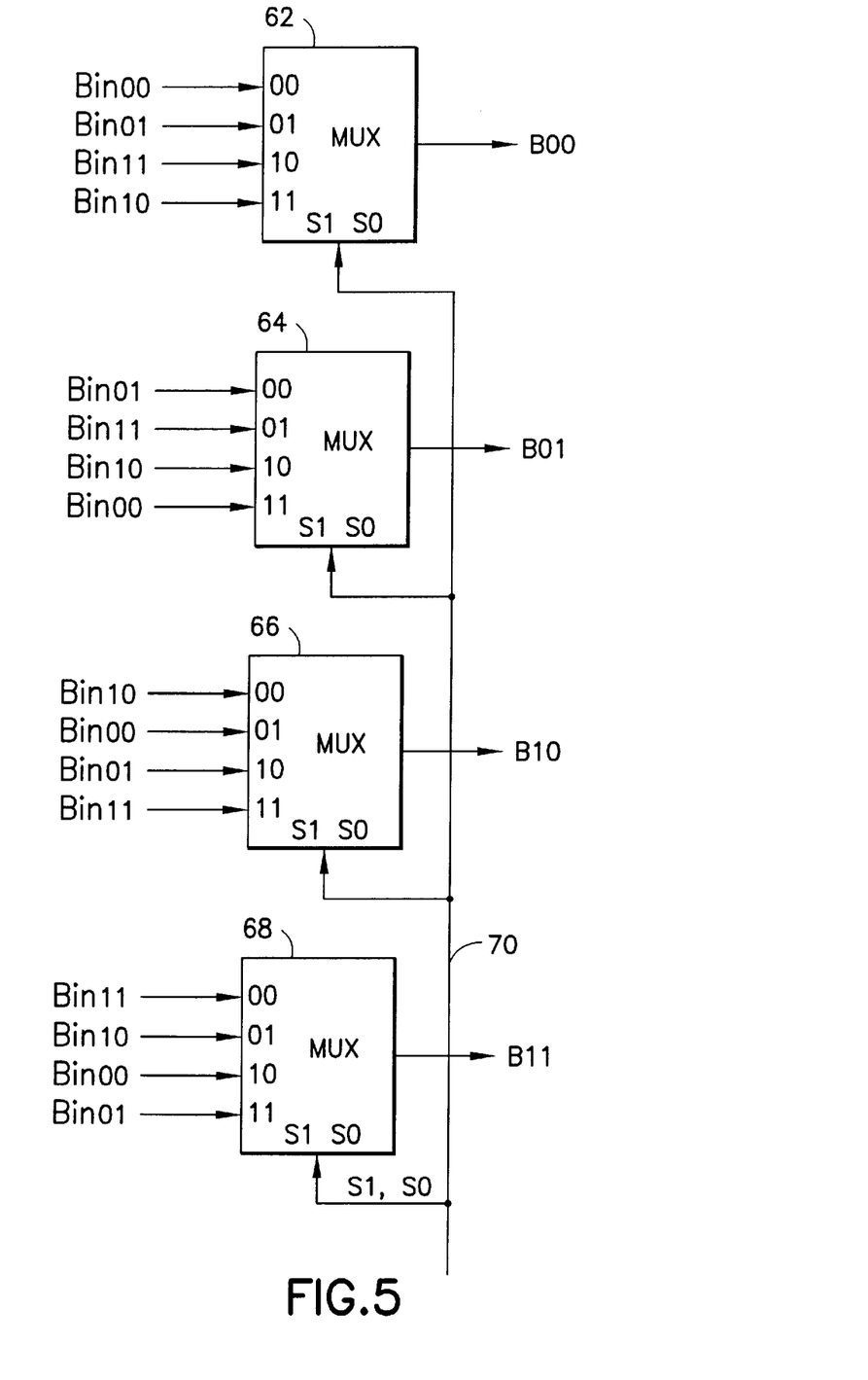
FIG. 5 shows diagrammatically components of a SELECT block of the diagram of FIG. 4.

A description of the selector 56 of FIG. 4 is provided in Fig.5 which shows four multiplexers 62, 64, 66, and 68 which are driven by signals S1 and S0 on line 70. As shown in FIG. 4, the S1 signal is PIE[6] providing the signs of the I and the Q components which serve to identify the quadrant. The S0 component is provided by the multiplexer 60. All of the multiplexers 62, 64, 66, and 68 connect with output terminals of the mapper 52 with differing terminal connections as are indicated in FIG. 5. Thereby, selection of any one of the multiplexers 62, 64, 66, and 68 provides the desired one of the four possible permutations of the branch metrics.

Figure 6:
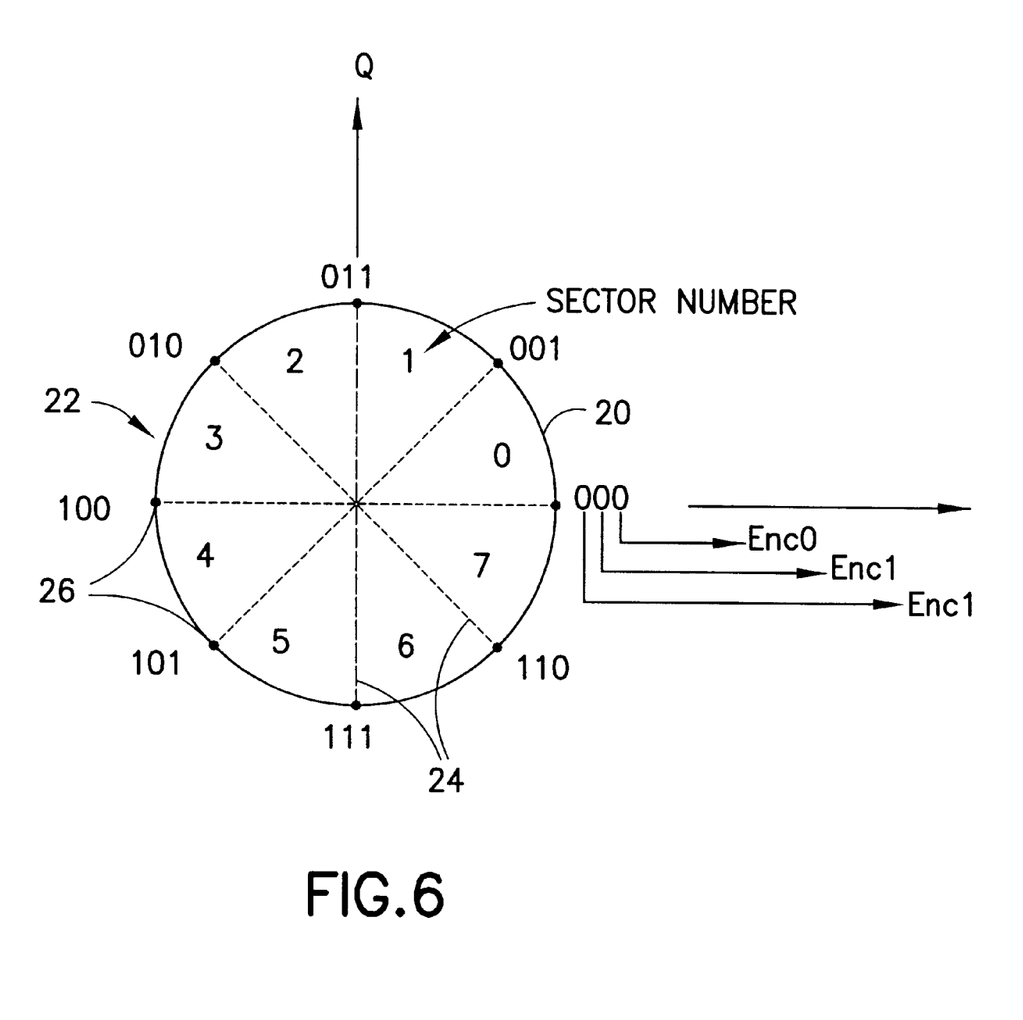
FIG. 6 is a modification of the diagram of FIG. 1 for the case of 8-PSK modulation.

The diagram presented in FIG. 6 is similar to the diagram presented in FIG. 1 (for the 16-PSK modulation) except that, in FIG. 6, the diagram represents the situation for 8-PSK modulation. Therefore, in FIG. 6, there are only half as many constellation points 26. The four-digit binary number of FIG. 1 which identifies a constellation point 26 is reduced in FIG. 6 to a three-digit binary number. The left and the center digit identify the quadrant while the single right digit identifies the sector 20.

Figure 7:
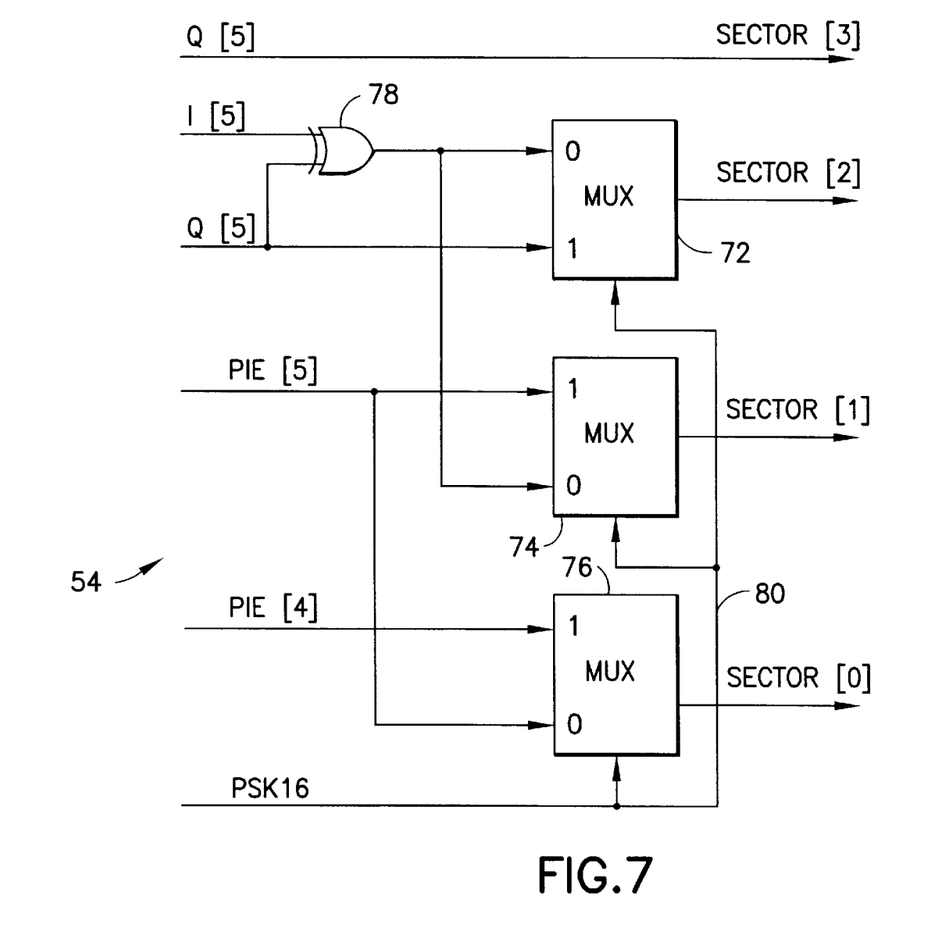
FIG. 7 is a block diagram of a sector mapper of FIG. 4.

A description of the sector mapper 54 of FIG. 4 is provided in FIG. 7 for both of the cases of 16-PSK modulation and 8-PSK modulation. The sector mapper 54 comprises three multiplexers 72, 74, and 76, and an exclusive-OR gate 78. The gate 78 provides input signals to the multiplexers 72 and 74. Additional inputs to the gate 78 and to the multiplexers 72, 74, and 76 are bits of the I signal, the Q signal, and the PIE. A line 80 connects with all of the multiplexers 72, 74, and 76 for applying a control signal, either a logic-1 or a logic-0, respectively, for operation of the mapper 54 in either the case of 16-PSK or the case of 8-PSK.

The principals of operation of the mapping are as follows:
  i) The 2-dimensional circular plane is divided into $2^8 = 256$ angles with resolution of 360/256=1.406 degrees each called PIE. The PIE's are numbered in sequence from 0 to 63 for each quadrant. The PIE numbers are stored in one ROM, with the magnitudes of I and Q-channel data as address inputs.

ii) The angle between two adjacent signal constellation points is divided into 9 regions, each region corresponding to one particular branch metrics output pattern. The branch metric outputs of one region of one adjacent constellation pairs is related to the branch metrics of corresponding section of other two adjacent constellation pairs. The relation is simply a permutation of the branch metrics relative to each other.

iii) The received I and Q channel data pairs are mapped into four branch metrics and one sector number using the above rules.

16-PSK MAPPER:

The main task of the mapper is to calculate an appropriate measure of Euclidean distance between the received (I,Q) pair and corresponding constellation points associated with (ENC1, ENC0) pair equal to 00,01,10, and 11. The 16-PSK modulation with sector number and corresponding bit assignments to each constellation point is shown in FIG. 1.

Upon the arrival of I- and Q-channel data (each in 6-bits sign magnitude format), a PIE number is assigned according to the angle calculated by $\phi = a\tan(|I|/|Q|)$ or $\phi = a\tan(|Q|/|I|)$. In FIG. 8, the PIE numbers for the first quadrant, i.e. when both I and Q are positive, is listed. The resulting PIE numbers for positive values of I and Q, assuming that data is represented in sign-magnitude format, are shown in FIG. 8. The PIE number, branch metrics and sector number for received (I,Q) pair with $0.0 \leq \phi < 22.5$ are listed in Table 1. Similarly, Table 2 lists PIE, sector number and branch metrics for the case of $22.5 \leq \phi < 45$. It can be easily verified that the corresponding rows of Tables 1 and 2 are related through the following permutation rule:

B00 of Table 2=B10 of Table 1

B01 of Table 2=B00 of Table 1

B10 of Table 2=B11 of Table 1

B11 of Table 2=B01 of Table 1

PIE in rows of Table 2=16+PIE in corresponding rows of Table 1.

Sector number in Table 2=1+Sector number in Table 1.

TABLE 1

Mapping Rules for 16-PSK with $0.0 \leq \phi < 22.5$

| PIE# | Angle | B00 | B01 | B11 | B10 | Sector# |
|---|---|---|---|---|---|---|
| 0 | $0.0 \leq \phi < 1.4$ | 0 | 4 | 7 | 4 | 0 |
| 1,2 | $1.4 \leq \phi < 4.2$ | 0 | 3 | 7 | 4 | 0 |
| 3,4 | $4.2 \leq \phi < 7.0$ | 0 | 2 | 6 | 4 | 0 |
| 5,6 | $4.2 \leq \phi < 9.8$ | 0 | 1 | 5 | 4 | 0 |
| 7,8 | $9.8 \leq \phi < 12.7$ | 0 | 0 | 4 | 4 | 0 |
| 9,10 | $12.7 \leq \phi < 15.5$ | 1 | 0 | 4 | 5 | 0 |
| 11,12 | $15.5 \leq \phi < 18.3$ | 2 | 0 | 4 | 6 | 0 |
| 13,14 | $18.3 \leq \phi < 21.1$ | 3 | 0 | 4 | 7 | 0 |
| 15 | $21.1 \leq \phi < 22.5$ | 4 | 0 | 4 | 7 | 0 |

TABLE 2

Mapping Rules for 16-PSK with $22.5 \leq \phi < 45$

| PIE# | Angle | B00 | B01 | B11 | B10 | Sector# |
|---|---|---|---|---|---|---|
| 16 | $22.5 \leq \phi < 23.9$ | 4 | 0 | 4 | 7 | 1 |
| 17,18 | $23.9 \leq \phi < 26.7$ | 4 | 0 | 3 | 7 | 1 |
| 19,20 | $26.7 \leq \phi < 29.5$ | 4 | 0 | 2 | 6 | 1 |
| 21,22 | $29.5 \leq \phi < 32.3$ | 4 | 0 | 1 | 5 | 1 |
| 23,24 | $32.3 \leq \phi < 35.2$ | 4 | 0 | 0 | 4 | 1 |
| 25,26 | $35.2 \leq \phi < 38.0$ | 5 | 1 | 0 | 4 | 1 |

TABLE 2-continued

Mapping Rules for 16-PSK with $22.5 \leq \phi < 45$

| PIE# | Angle | B00 | B01 | B11 | B10 | Sector# |
|---|---|---|---|---|---|---|
| 27,28 | $38.0 \leq \phi < 40.8$ | 6 | 2 | 0 | 4 | 1 |
| 29,30 | $40.8 \leq \phi < 43.6$ | 7 | 3 | 0 | 4 | 1 |
| 31 | $43.6 \leq \phi < 45.0$ | 7 | 4 | 0 | 4 | 1 |

Similar relations exist between branch metrics of points with PIE numbers in Table 1 (sector number=0), and branch metrics of points with corresponding rows comprising other sector numbers of 2, 3, . . . , 15. This suggests implementing the first mapper 34 to convert I and Q into PIE numbers, the mapper 50 to convert PIE numbers into row-numbers each of which addresses one row of Table 1 and finally the selector 56 to perform the permutation.

The MainMap block 34 performs the look-up table to convert the 6-bit magnitude of I and Q channel data into PIE numbers based on the angle of the received (I,Q) point, i.e. a $\tan(|I|/|Q|)$ or a $\tan(|Q|/|I|)$. In order to reduce the hardware, the received vector is mapped into a PIE number between 0 to 63 rather than 0 to 255. The mapper in FIG. 3 maps only positive I and Q into PIE number between 0 and 63. However, the two input multiplexers 38 and 40 interchange the role of I and Q if the received data is in the second or fourth quadrant, i.e. when both I and Q do not have the same sign-bits.

The ROM 46 may be a 1 K×6 ROM.

The Map2 block 36 uses the PIE numbers, sign-bits of I and Q channel data and generates the sector number and branch metrics.

The PIE to row mapper 50 maps the 4-bit PIE number ranging from 0 to 15 into 9 row numbers ranging from 0 to 8. This mapping rule, which resembles Table 1, is given in Table 3.

TABLE 3

Mapping Rules for PIE to Row number Mapper

| Input PIE | Output ROW |
|---|---|
| 0 | 0000 |
| 1,2 | 0001 |
| 3,4 | 0010 |
| 5,6 | 0011 |
| 7,8 | 0100 |
| 9,10 | 0101 |
| 11,12 | 0110 |
| 13,14 | 0111 |
| 15 | 1000 |

The branch-metric mapper 52 maps four 3-bit branch matrics 4-bit input row number. The mapping rule is shown in Table 4. The mapper can be thought of a 9 rows by 12 columns ROM.

TABLE 4

Branch-Metric Mapping Rule

| Row | B00 | B01 | B11 | B10 |
|---|---|---|---|---|
| 0 | 0 | 4 | 7 | 4 |
| 1 | 0 | 3 | 7 | 4 |
| 2 | 0 | 2 | 6 | 4 |
| 3 | 0 | 1 | 5 | 4 |
| 4 | 0 | 0 | 4 | 4 |

TABLE 4-continued

Branch-Metric Mapping Rule

| Row | B00 | B01 | B11 | B10 |
|-----|-----|-----|-----|-----|
| 5 | 1 | 0 | 4 | 5 |
| 6 | 2 | 0 | 4 | 6 |
| 7 | 3 | 0 | 4 | 7 |
| 8 | 4 | 0 | 4 | 7 |

The sector mapper 54 uses the sign-bits of I and Q-channel data and PIE number output of MainMap 34 to generate the final sector number. The following rules are used to extact the final sector number.

Find the Pre-sector number=PIE[5:4], i.e. a between 0 and 3 ii) Calculate the final sector number as:
Sector=Pre-sector+0 if I[5]='0', and Q[5]='0'
Sector=Pre-sector+4 if I[5]='1', and Q[5]='0'
Sector=Pre-sector+8 if I[5]='1', and Q[5]='1'
Sector=Pre-sector+12 if I[5]='0', and Q[5]='1'

Select:

This block basically realizes the permutation rules between different sub-tables and Table 3. For the 16-PSK modulation, the two most significant bits of PIE number will dictate all the necessary permutations. The block diagram of the Select is shown in FIG. 5, and the permutation rules are summarized in Table 5.

TABLE 5

Permutation rules for 16-PSK

| Sector# | B00 | B01 | B10 | B11 |
|---------|-----|-----|-----|-----|
| 0,4,8,12 | Bin00 | Bin01 | Bin10 | Bin11 |
| 1,5,9,13 | Bin01 | Bin11 | Bin00 | Bin10 |
| 2,6,10,14 | Bin11 | Bin10 | Bin01 | Bin00 |
| 3,7,11,15 | Bin10 | Bin00 | Bin11 | Bin01 |

The 8-PSK constellation with the corresponding sector numbers and bit-assignments is shown in FIG. 6. The same principles apply to map the I and Q-channel data into branch metrics and sector numbers. However, for 8-PSK the sector number ranges from 0 to 7 and the two adjacent signal constellation points are separated by 45 degrees. The PIE numbers, and corresponding branch metrics and sector numbers for the received point with $0 \leq \phi < 45$ are shown in Table 6.

The PIE numbers shown in FIG. 8 are also used for 8 PSK mapping.

TABLE 6

Mapping Rules for 8-PSK with $0 \leq \phi < 45$

| PIE# | Angle | B00 | B01 | B11 | B10 | Sector# |
|------|-------|-----|-----|-----|-----|---------|
| 0,1 | $0.0 \leq \phi < 2.8$ | 0 | 4 | 7 | 4 | 0 |
| 2,3,4,5 | $2.8 \leq \phi < 8.4$ | 0 | 3 | 7 | 4 | 0 |
| 6,7,8,9 | $8.4 \leq \phi < 14.1$ | 0 | 2 | 6 | 4 | 0 |
| 10,11,12,13 | $14.1 \leq \phi < 19.7$ | 0 | 1 | 5 | 4 | 0 |
| 14,15,16,17 | $19.7 \leq \phi < 25.3$ | 0 | 0 | 4 | 4 | 0 |
| 18,19,20,21 | $25.3 \leq \phi < 30.9$ | 1 | 0 | 4 | 5 | 0 |
| 22,23,24,25 | $30.9 \leq \phi < 36.6$ | 2 | 0 | 4 | 6 | 0 |
| 26,27,28,29 | $36.6 \leq \phi < 42.2$ | 3 | 0 | 4 | 7 | 0 |
| 30,31 | $42.4 \leq \phi < 45.0$ | 4 | 0 | 4 | 7 | 0 |

Sector Mapper:

The Sector Mapper is designed similarly, following the rules:
i) Find the Pre-sector number=PIE[5], i.e. 0 or 1
ii) Calculate the final sector number as:
Sector=Pre-sector+0 if I[5]='0', and Q[5]='0'
Sector=Pre-sector+2 if I[5]='1', and Q[5]='0'
Sector=Pre-sector+4 if I[5]='1', and Q[5]='1'
Sector=Pre-sector+6 if I[5]='1', and Q[5]='1'
Sector=Pre-sector+6 if I[5]='1', and Q[5]='1'

The design of the "Sector Mapper" is shown in FIG. 7. In case of 8-PSK modulation, PSK 16 is set to '0' and Sector [2:0] is the final sector number. In case of 16-PSK modulation, PSK 16 is set to '1' and Sector [3:0] is the final sector number.

PIE-to-Row and branch-Metric Mappers:

By comparing the entries in Table 1 and Table 6, one can conclude that for 8-PSK modulation, the same PIE to Row number mapper can be used in PIE [4:1] that is ignoring the least significant bit. The same branch-metrics mapper and Selector blocks are uses.

Select:

The permutation rule for 8-PSK modulation is summarized in Table 7. Based on this Table we have used the most significant bit of PIE number and or of sign bits of I and Q channel to address the multiplexes as shown in FIG. 4 for the case of PSK16='0'.

TABLE 7

Permutations of Select for 8-PSK

| Sector# | B00 | B01 | B10 | B11 |
|---------|-----|-----|-----|-----|
| 0,4 | Bin00 | Bin01 | Bin10 | Bin11 |
| 1,5 | Bin01 | Bin11 | Bin00 | Bin10 |
| 2,6 | Bin11 | Bin10 | Bin01 | Bin00 |
| 3,7 | Bin10 | Bin00 | Bin11 | Bin01 |

In applications where hardware complexity is not of main concern, representing branch metrics in 4-bits will slightly improve the performance of the Viterbi decoder. In Table 8, a sample 4-bit branch metrics mapping rule for 16-PSK is listed. The main change in the implementation is a slight increase in the complexity of the realization of MAP2.

TABLE 8

A sample 4-Bit Mapping Rules for 16-PSK with $0.0 \leq \phi < 22.5$

| PIE# | Angle | B00 | B01 | B11 | B10 | Sector# |
|------|-------|-----|-----|-----|-----|---------|
| 0 | $0.0 \leq \phi < 1.4$ | 0 | 5 | 15 | 6 | 0 |
| 1,2 | $1.4 \leq \phi < 4.2$ | 0 | 4 | 14 | 7 | 0 |
| 3,4 | $4.2 \leq \phi < 7.0$ | 0 | 3 | 14 | 8 | 0 |
| 5,6 | $7.0 \leq \phi < 9.8$ | 1 | 2 | 12 | 10 | 0 |
| 7,8 | $9.8 \leq \phi < 12.7$ | 1 | 1 | 11 | 11 | 0 |
| 9,10 | $12.7 \leq \phi < 15.5$ | 2 | 1 | 10 | 12 | 0 |
| 11,12 | $15.5 \leq \phi < 18.3$ | 3 | 0 | 8 | 14 | 0 |
| 13,14 | $18.3 \leq \phi < 21.1$ | 4 | 0 | 7 | 14 | 0 |
| 15 | $21.1 \leq \phi < 22.5$ | 5 | 0 | 6 | 15 | 0 |

FIG. 9 show a communication system 100 suitable for communicating via the PSK modulation described above. The system 100 comprises an oscillator 102 which generates a carrier to be modulated by a phase modulator 104 with phase shifts by phase shift keying, the desired values of phase shift being provided to the modulator 104 by a source of data 106. A clock 108 is generated from the oscillator 102 and drives the data source 106 to output phase angles to the modulator 104. In the case of 16-PSK modulation, the data source outputs 16 different values of phase angle to the modulator 104. In the case of 8-PSK modulation, the data source outputs 8 different values of phase angle to the modulator 104. The phase modulated carrier outputted by the modulator 104 is applied to a transmitter 110 for transmission via a communication link 112 to a receiving station 114.

At the receiving station 114, the carrier signal is received by a receiver 116 and applied to a carrier recovery circuit 118. The receiving station 114 further comprises two synchronous detectors 120 and 122, a 90 degree phase shifter 124, a symbol clock recovery circuit such as early-late gate 126, two analog-to-digital converters 128 and 130, and a data recovery unit 132. The carrier recovery circuit 118 includes well-known circuitry for extraction of a carrier from a phase modulated signal, such circuitry being, by way of example, a Costas loop or local oscillator with phase locked loop. The carrier itself, or inphase component, is applied directly to the detector 120, and is applied via the phase shifter 124 to be applied as the quadrature component to the detector 122. The recovery circuit 118 provides a synchronization signal for synchronizing the clock 126 to the recovered carrier.

The phase modulated carrier signal, outputted by the receiver 116, is applied also to the inphase detector 120 and the quadrature detector 122 for detection of the inphase (I) component and the quadrature (Q) component, the I and the Q components then being applied respectively to the converters 128 and 130 for conversion from analog format to digital format. These digitally formatted signals are then applied by the converters 128 and 130 as input signals to the data recovery unit 132. The data recovery unit 132 includes the signal processing elements disclosed above in FIGS. 2–5 and 7. Also included in the data recovery unit 132 is a pragmatic decoder, such as a Viterbi decoder, which operates on the branch metric signals to obtain a precise value of each transmitted phase angle.

Figure 10:
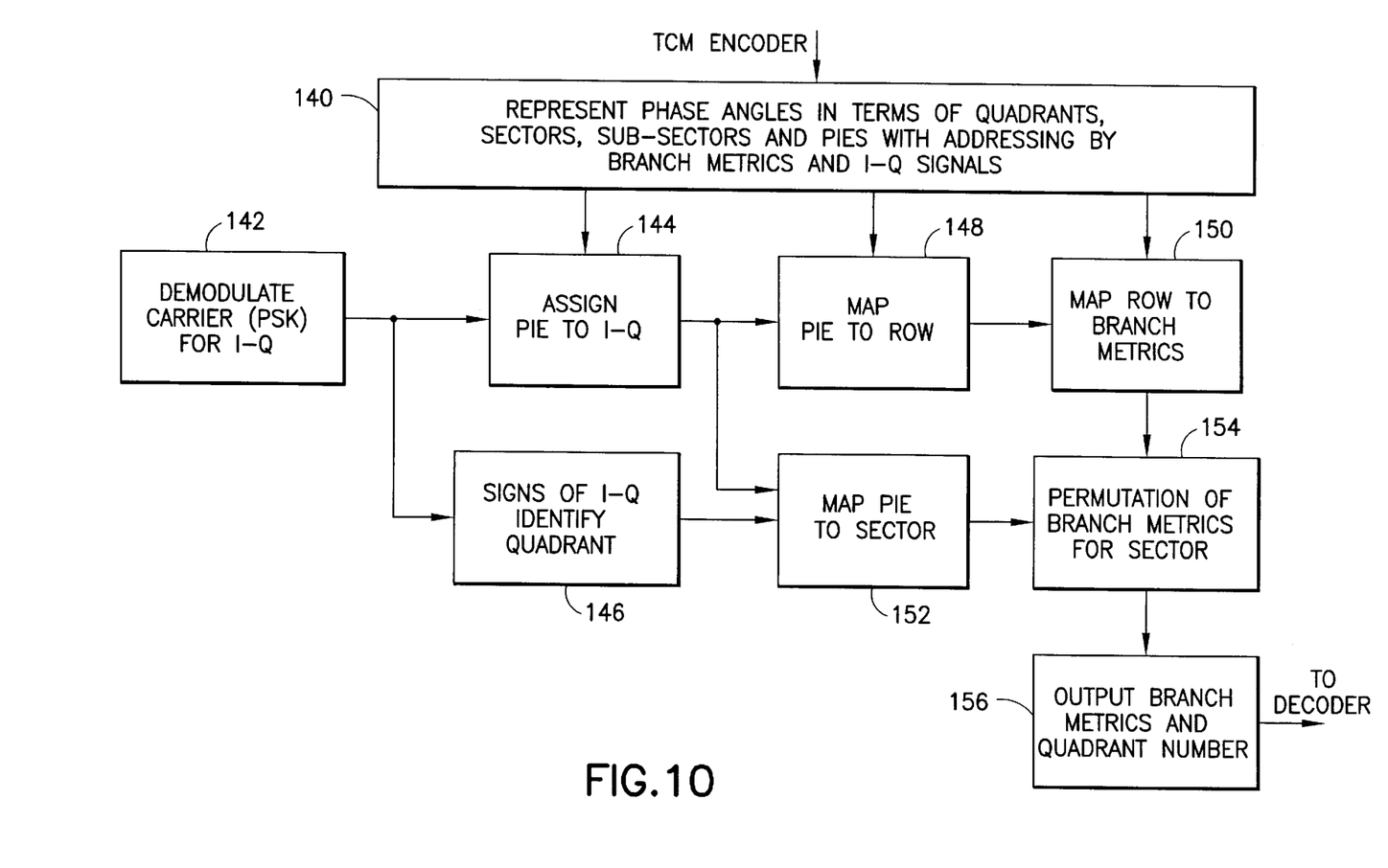
FIG. 10 is a flow chart of steps in the procedure of the invention.

FIG. 10 shows steps in the practice of the invention. At block 140, phase angles are represented in terms of quadrants, sectors, sub-sectors and PIEs. A received PSK modulated signal is demodulated at block 142 to obtain I and Q components of the carrier phase. The I and the Q components are applied to blocks 144 and 146, respectively, to obtain the PIE corresponding to the I and Q components, and to obtain the quadrant corresponding to the I and Q components. The PIE from block 144 is mapped at block 148 to the corresponding row (Tables 1, 2 and 3), and the resulting row is mapped at block 150 (Table 4) to the branch metrics. The operations at blocks 144, 148 and 150 employ the sector relationships provided by block 140. The quadrant data from block 146 is employed at block 152 to map the PIE data of block 144 to obtain the sector. At block 154, the sector data of block 152 and the branch metrics of block 150 are employed to perform a permutation of the branch metrics to obtain the branch metrics for the sector of the detected phase. The resulting branch metrics and the quadrant number are outputted at block 156 for use by a decoder.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A method of generating branch metrics suitable for a pragmatic TCM decoder to recover trellis coded phase modulated data, the method comprising steps of:
    expressing angles of phase shift by a vectorial representation of sectors within quadrants of a circle, the sectors being subdivided into sub-sectors of differing sizes, and the sub-sectors being further divided into equal increments of angle referred to as PIEs;
    identifying the PIEs numerically within each of the quadrants, and identifying each of the quadrants by the signs of inphase and quadrature components of detected carrier phase;
    in each quadrant, assigning a set of branch metrics to serve as identifiers of respective ones of the sub-sectors in each sector of the quadrant, the set of branch metrics in one sector of the quadrant differing from the set of branch metrics in another of the sectors of the quadrant by a permutation of the branch metrics;
    mapping the inphase and quadrature components of a detected phase angle to one of the PIEs; and
    outputting identifying components of the one PIE, one of the identifying components being a corresponding set of branch metrics, and a second of the identifying components being the identity of the corresponding quadrant.

2. A method according to claim 1 further comprising a step of assigning twice as many of said PIEs to a sub-sector located at a central portion of any one of said sectors as in a sub-sector located at an edge of said one sector.

3. A method according to claim 1 wherein there is an odd number of said sub-sectors in each of said sub-sectors.

4. A method according to claim 3 wherein there are nine of said sub-sectors in each of said sectors.

5. A method according to claim 4 further comprising a step of assigning twice as many of said PIEs to a sub-sector located at a central portion of any one of said sectors as in a sub-sector located at an edge of said one sector.

6. A method according to claim 5 wherein there is an equal number of said PIEs in each of said sub-sectors in all of said sectors.

7. A method according to claim 6 wherein said modulation is 16-PSK modulation, the first and the ninth of said sub-sectors in each of said sectors has one of said PIEs, and the second sub-sector through the eighth sub-sector in each of said sectors has two of said PIEs.

8. A method according to claim 6 wherein said modulation is 8-PSK modulation, the first and the ninth of said sub-sectors in each of said sectors has two of said PIEs, and the second sub-sector through the eighth sub-sector in each of said sectors has four of said PIEs.

9. A method according to claim 1 wherein said step of assigning branch metrics includes a step of arranging said branch metrics in any one of said sectors in each of said quadrants in an array of rows and columns wherein the number of rows is equal to the number of sub-sectors of said one sector with individual ones of the rows being assigned to respective ones of said sub-sectors of said one sector, and wherein said permutation is a permutation of said columns.

10. A method according to claim 9 wherein a same set of said branch metrics is employed in each of said quadrants.

11. A method according to claim 10 wherein there are four of said columns in said set of branch metrics.

* * * * *